UNITED STATES PATENT OFFICE.

EDWARD JAMES HORWOOD, OF BROKEN HILL, NEW SOUTH WALES, AUSTRALIA.

SEPARATION OF ZINC-BLENDE AND OTHER METALLIFEROUS CONSTITUENTS FROM ORE CONCENTRATES AND SLIMES BY FLOTATION OR GRANULATION.

1,108,440.　　　　　Specification of Letters Patent.　　Patented Aug. 25, 1914.

No Drawing.　　　　Application filed December 4, 1913.　Serial No. 804,617.

*To all whom it may concern:*

Be it known that I, EDWARD JAMES HORWOOD, a subject of the King of Great Britain, and resident of Lane street, Broken Hill, in the State of New South Wales, in the Commonwealth of Australia, mining engineer, have invented certain new and useful Improvements in and Relating to the Separation of Zinc-Blende and other Metalliferous Constituents from Ore Concentrates and Slimes by Flotation or Granulation, of which the following is a specification.

The present invention relates to an improvement in the process of separating by flotation or granulation, the constituent minerals from crude ore, tailings, concentrates, slimes or a metalliferous product of mixed sulfids containing zinc sulfid with sulfids of lead, iron, copper, or silver, or other minerals, and is characterized by subjecting the crude ore, slimes, or mixed sulfids to a preliminary washing operation with water, prior to submitting the same to a preliminary heating operation, such as is described in the specification of my Patent No. 1,020,353, granted Mar. 12, 1912, for the purpose of obtaining in a subsequent separation by a selective wetting process, as by flotation or granulation, a more effective and economical separation of zinc; and also for the purpose of diverting from the zinc, a larger proportion or percentage of the silver, to the unfloated leady or other residues.

With certain classes of ore or metalliferous material, I have in practice found, that the material after being subjected to a preliminary heating operation, at a temperature of from 400° C. or thereabouts, to deaden one or more of the sulfid particles in relation to a subsequent flotation or granulation separation as described in my Patent No. 1,020,353 has required a temperature of about 180° F. to successfully float the unaltered zinc sulfid in the subsequent flotation process; and that in some cases, a substantial portion of the zinc has been slightly oxidized during the preliminary heating. This oxidized zinc has required to be satisfied with acid before the flotation of the zinc sulfid could be effected, thereby leading to loss of zinc by solution and an increased acid consumption in the flotation. In addition I have also found that the silver contained in the material, has in the subsequent flotation or granulation processes, sometimes been separated together with the unaltered zinc sulfid, and has otherwise sometimes remained with the deadened or altered lead or iron or copper particles in a manner which cannot be fully explained.

From experiments I have ascertained, that if the ore or sulfid material is thoroughly washed with clean water to remove the soluble salts from the constituent mineral particles, prior to sulfatizing or oxidizing the same by a heating operation at a temperature of from 400° C. or thereabout in the manner described in the specification of my Patent No. 1,020,353, that the quantity of oxidized zinc formed is reduced to an insignificant amount; and that much less acid is required in the subsequent flotation operation to separate the zinc sulfid from the altered lead, iron, copper, silver or other minerals; and also that successful flotations can readily be obtained at a temperature of 120° F. or less; and that the division of zinc from lead, copper, iron, silver or other mineral particles is much cleaner and better.

I have also found that the removal of the soluble salts prior to subjecting the material to the preliminary heating operation, enables the silver to be deadened to flotation to a much greater extent than is the case if such soluble salts are not previously removed. This feature greatly enhances the subject matter and value of my previous Patent No. 1,020,353, in that much less silver floats with the zinc sulfid, and a proportionately larger amount remains with the lead-containing and other residues.

According to my present invention, the ore or sulfid material may be thoroughly washed with clean water to remove the soluble salts from the constituent mineral particles in any well known metallurgical manner; this washing being advantageously performed by filter pressing or its equivalent means.

Having now fully described my invention, I declare that what I claim and desire to secure by Letters Patent is:—

1. In a process of separating sulfids, the method which comprises extracting water soluble substances from a material comprising a plurality of such sulfids and thereafter submitting to a heating operation for deadening certain of such sulfids.

2. In a process of separating sulfids, the method which comprises extracting water soluble substances from a material comprising a plurality of such sulfids, thereafter submitting to a heating operation to deaden certain of such sulfids and finally separating the sulfids by a selective wetting operation.

3. In the separation of sulfids, the process which comprises thoroughly washing with water a material comprising zinc blende and other sulfids, submitting to a heating operation to deaden sulfids other than zinc sulfids and finally separating the various sulfids by a selective wetting operation.

4. In the separation of sulfids, the process which comprises washing a material comprising a plurality of such sulfids with water, thereafter deadening certain of such sulfids by an oxidizing treatment and finally separating the various sulfids by a selective wetting operation.

5. In the separation of sulfids, the process which comprises thoroughly washing with water a material comprising zinc blende and other sulfids, submitting to a heating operation at about 400° C. to deaden sulfids other than zinc sulfid and finally separating the various sulfids by a selective wetting operation.

In testimony whereof I have affixed my signature in presence of two witnesses.

EDWARD JAMES HORWOOD.

Witnesses:
 ARTHUR JAMES LEYSON,
 HAROLD STRACHAN KITSON.